United States Patent
Feldmann et al.

(10) Patent No.: US 9,816,379 B2
(45) Date of Patent: Nov. 14, 2017

(54) BALANCING BODY FOR A CONTINUOUS BLADE ARRANGEMENT

(71) Applicant: MTU Aero Engines AG, Munich (DE)

(72) Inventors: Manfred Feldmann, Eichenau (DE);
Andreas Holzel, Herrsching (DE);
Amelia Frodyma, Brzozówka (PL)

(73) Assignee: MTU AERO ENGINES AG, Munich (DE)

( * ) Notice: Subject to any disclaimer, the term of this patent is extended or adjusted under 35 U.S.C. 154(b) by 679 days.

(21) Appl. No.: 14/219,726

(22) Filed: Mar. 19, 2014

(65) Prior Publication Data
US 2014/0348655 A1    Nov. 27, 2014

(30) Foreign Application Priority Data
May 27, 2013    (EP) ..................... 13169289

(51) Int. Cl.
*F01D 5/02* (2006.01)
*F16F 15/32* (2006.01)
*F01D 25/28* (2006.01)
*F01D 5/22* (2006.01)

(52) U.S. Cl.
CPC ............ *F01D 5/027* (2013.01); *F01D 5/225* (2013.01); *F01D 25/28* (2013.01); *F16F 15/32* (2013.01); *F05D 2230/60* (2013.01); *F05D 2260/15* (2013.01); *Y10T 29/4932* (2015.01); *Y10T 29/49245* (2015.01)

(58) Field of Classification Search
CPC .......... F01D 5/027; F01D 5/225; F01D 25/28; F16F 15/32; Y10T 29/4932; F05D 2260/15; F25D 2230/60
See application file for complete search history.

(56) References Cited

U.S. PATENT DOCUMENTS

| 3,588,269 A * | 6/1971 | Wall, Jr. ............... F01D 17/162 415/115 |
| 5,011,374 A * | 4/1991 | Miller ..................... F01D 5/027 416/144 |
| 5,244,345 A * | 9/1993 | Curtis ................... F01D 11/008 416/193 A |
| 5,425,621 A * | 6/1995 | Maar ....................... F01D 5/027 416/144 |
| 8,936,440 B2 * | 1/2015 | Alvanos ................. F01D 5/147 416/193 A |
| 2010/0172760 A1 * | 7/2010 | Ammann ............... F01D 5/282 416/179 |
| 2012/0087794 A1 * | 4/2012 | Calza ..................... F01D 5/225 416/190 |
| 2012/0301317 A1 * | 11/2012 | Alvanos ................. F01D 5/147 416/241 B |

FOREIGN PATENT DOCUMENTS

| DE | 102004026365 A1 | 12/2005 |
| EP | 1605134 A2 | 12/2005 |
| EP | 2169181 A2 | 3/2010 |

* cited by examiner

*Primary Examiner* — Jessica Cahill
*Assistant Examiner* — Daphne M Barry
(74) *Attorney, Agent, or Firm* — Barlow, Josephs & Holmes, Ltd.

(57) ABSTRACT

The present invention relates to a balancing body (1) for fastening to a ring (4, 5) of a continuous blade arrangement of a compressor or turbine stage of a gas turbine, wherein the balancing body has a first stop (11) for the form-fitting attachment of the balancing body in one peripheral direction (R) to a first axial shoulder (6; 7) of the ring.

12 Claims, 2 Drawing Sheets

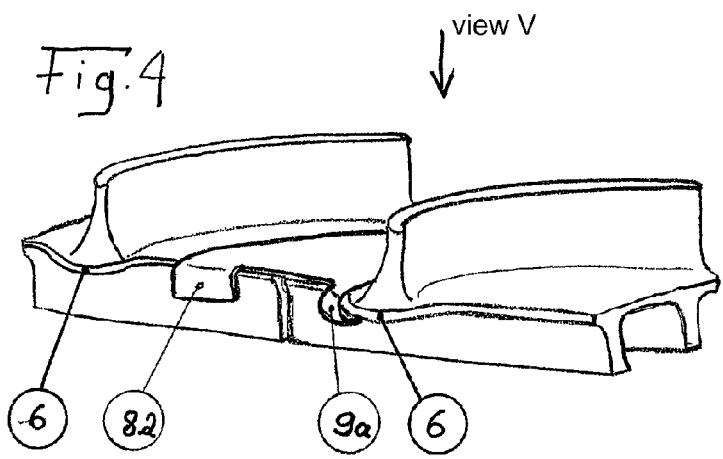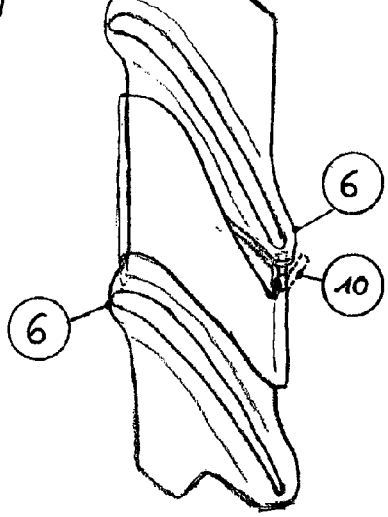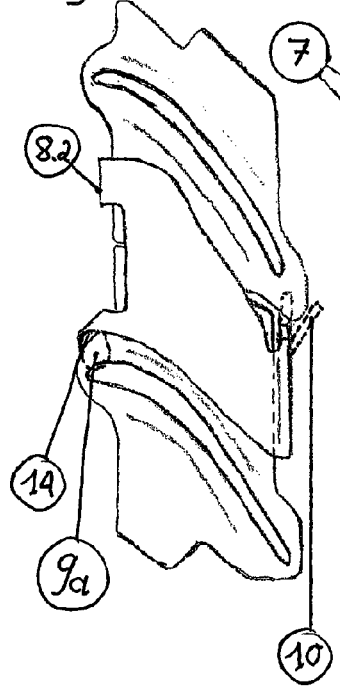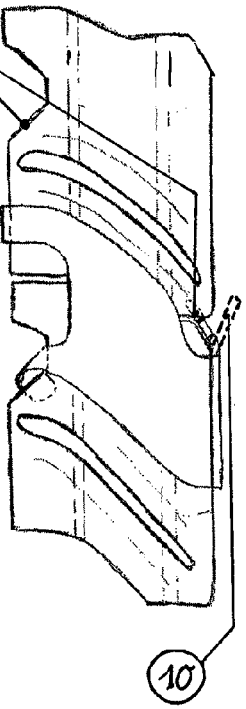

BALANCING BODY FOR A CONTINUOUS BLADE ARRANGEMENT

BACKGROUND OF THE INVENTION

The present invention relates to a balancing body for fastening to a ring of a continuous blade arrangement, a continuous blade arrangement of a compressor or turbine stage of a gas turbine having such a balancing body, as well as a method for attaching or detaching such a balancing body from the continuous blade arrangement.

It is known from U.S. Pat. No. 5,011,374 to fasten a balancing body with frictional fit by crimping to a shroud of a gas turbine stage. Instead of this, US 2005/0265845 A1 and US 2012/0087794 A1 propose to support the balancing body in a form-fitting manner to the same rotating blade or to two adjacent rotating blades. The rotating blades may be damaged in this way.

SUMMARY OF THE INVENTION

An object of one embodiment of the present invention is to improve a gas turbine.

This object is achieved by a balancing body of the present invention. The present invention provides a continuous blade arrangement having such a balancing body as well as a method for attaching or detaching such a balancing body from the continuous blade arrangement. The present invention also provides various advantageous embodiments.

One aspect of the present invention relates to a continuous blade arrangement of a compressor or turbine stage or for a compressor or turbine stage of a gas turbine, as well as a gas turbine having such a compressor or turbine stage or continuous blade arrangement. The continuous blade arrangement has a plurality of rotating blades that are adjacent or distributed in one peripheral direction. These may be fastened in a detachable manner or permanently to a rotor of the turbine (stage), and, in particular, can be formed integrally with the latter.

The continuous blade arrangement has a ring, which delimits a flow channel for a working medium of the gas turbine. In one embodiment, the ring is a one-part or multi-part radially outer or outside ring or a so-called outer shroud, which can be joined to one or more rotating blades. Likewise, the ring can be a one-part or multi-part radially inner or inside ring or a so-called blade platform, which can be joined to one or more rotating blades.

One or a plurality of balancing bodies is or will be disposed on the ring, preferably at one or a plurality of pre-defined peripheral positions, each time between two rotating blades of the continuous blade arrangement that are adjacent in a peripheral direction. In one embodiment, a balancing body engages over a separating line between two adjacent ring parts in one peripheral direction. The mass or mass distribution of a balancing body can be represented in one embodiment by variations including one or a plurality of recesses and/or by variations in the wall thickness of the balancing body.

According to one aspect of the present invention, a balancing body is attached distanced from the adjacent rotating blades, between which it is disposed, in one peripheral direction and in form-fitting manner by means of an axial shoulder of the ring or by two oppositely directed axial shoulders. In one embodiment, the danger of damaging the rotating blades can be reduced by the balancing body in this way. Additionally or alternatively, the mounting and/or demounting of balancing bodies, particularly in situ on the continuous blade arrangement disposed in the gas turbine, can be improved, preferably by means of an exhaust nozzle of the gas turbine.

Correspondingly, according to one aspect of the present invention, a balancing body for fastening to a ring of a continuous blade arrangement of a compressor or turbine stage of a gas turbine has a first stop for the form-fitting attachment of the balancing body to a first axial shoulder of the ring in one peripheral direction. Attachment is understood presently as at least a limitation of play in the peripheral direction, and in an enhancement, as a fastening that is resistant to rotation or is free of play, at least substantially. In another opposite peripheral direction or the direction opposite to the first stop-shoulder pair, the balancing body in one embodiment can be or is fastened in form-fitting manner by means of a second stop of the balancing body to a second axial shoulder of the ring. Likewise, the balancing body can also be attached in the other peripheral direction by means of a rotating blade of the continuous blade arrangement. The one peripheral direction can be a direction of rotation of the gas turbine or it can be opposite to this direction; the other, opposite peripheral direction correspondingly can be either the direction opposite to the direction of rotation of the gas turbine or can be the direction of rotation. In other words, the first stop-shoulder pair can attach the balancing body in the direction of rotation or in the direction opposite to it; a second stop-shoulder pair in the opposite direction can correspondingly attach the balancing body in the direction of rotation or in the direction opposite to it.

A stop and an axial shoulder are understood in the present case in particular as a surface, particularly a front surface, which extends, at least substantially, in the axial direction and in the radial direction, whereby the surface having the peripheral direction, at least substantially, forms a right angle or also can be beveled relative to it in the direction of rotation or in the opposite direction. In one embodiment, the front surface may have, at least substantially, the wall thickness of the rest of the ring or can be formed as a material projection or back cut of the ring in axial direction. Correspondingly, in one embodiment, the shoulder can extend continuously axially away from one rotating blade arrangement of the continuous blade arrangement or can be formed as an axial material projection. Advantageously, in this way, in one embodiment, a lever arm for limiting, and particularly for preventing, a rotation of the balancing body around a radial axis can be advantageously enlarged. Likewise, in one embodiment, the shoulder can extend axially to the rotating blade arrangement of the continuous blade arrangement or can be formed as an axial back cut section of material relative to an axial outer edge of the ring. In one embodiment, advantageously, an axial projection of the ring can be reduced or avoided thereby.

The one or more stop-shoulder pairs can attach the balancing body with play in one direction or in the opposite direction in one or two opposite peripheral directions or can limit its movement in the peripheral direction(s). In an enhancement, as mentioned above, the balancing body can also be set or is set resistant to rotation—at least is substantially free of play. In one enhancement, the balancing body is or will be braced in the peripheral direction. In particular, for this purpose, in one embodiment, at least one stop for the form-fitting attachment of the balancing body in one peripheral direction extends web-like or nose-like in the radial direction or can be formed pliable in this peripheral direction.

For the form-fitting attachment of the balancing body to the ring in the axial direction, in one embodiment, the balancing body has a first radial flange and a second radial flange that is axially distanced therefrom and is joined to the first radial flange by an axial web. In one embodiment, the two radial flanges engage over two axial front sides of the ring and are thus attached to the latter axially with or without play. In one enhancement, the ring is or will be axially clamped between the first and second radial flange. In particular, the first and/or second radial flange can be designed pliable for this purpose.

In one embodiment, viewed in the direction of rotation, a radial flange can converge toward the ring, and in particular, can be beveled in the direction of rotation. In this way, in one embodiment, a snagging or catching of the radial flange can be prevented.

In one embodiment, a stop for the form-fitting attachment of the balancing body in one peripheral direction can be disposed on a radial flange, and particularly can be formed integrally with the latter. In this case, in one embodiment, the first and second stops can be disposed on opposite-lying sides of the same radial flange in the peripheral direction. In another embodiment, the first stop is disposed on the first radial flange, and the second stop is disposed on the opposite-lying side of the axially distanced second radial flange in the peripheral direction. In one embodiment, the prevention of rotation of the balancing body can be improved in this way.

As mentioned above, the stop may extend web-like or nose-like in the radial direction. Correspondingly, a web-like or nose-like stop can be formed by means of a radial notch in a radial flange. In this way, the web-like stop can yield elastically or plastically into the notch in one peripheral direction.

For the form-fitting attachment of the balancing body to the ring in the radial direction, in one embodiment, the balancing body has one or two undercut sections, which are particularly axially distanced and which engage the ring from in back or underneath. In an enhancement, an undercut section can be disposed on a radial flange for the form-fitting attachment of the balancing body in the axial direction, and in particular can be formed integrally with the latter. Additionally or alternatively, the undercut section can be disposed on a stop for the form-fitting attachment of the balancing body in one peripheral direction, and, in particular, can be formed integrally with the latter. In this way, the attachments in the peripheral, radial and/or axial directions can be or will be combined. Correspondingly, in one embodiment, an undercut section can engage behind or underneath an axial shoulder of the ring, on which a stop of the balancing body attaches it in form-fitting manner in one peripheral direction. In one embodiment, an undercut section is formed by means of a folded tab, which at the same time forms a stop for the form-fitting attachment of the balancing body in the peripheral direction.

According to one aspect of the present invention, for the form-fitting attachment of the balancing body in the peripheral direction, at least one stop will be or is continuously elastically or plastically deformed in the axial direction relative to the rotating blade of the continuous blade arrangement, toward or away from the latter, and thus is brought in or out of alignment with the opposite-lying shoulder of the ring in the peripheral direction, in particular with a form-fitting, preferably pre-tensioned contact. Alignment or being in alignment presently is understood in particular as an arrangement such that the shoulder limits in form-fitting manner a further movement of the stop in one peripheral direction, and, in particular, in such a way that the shoulder contacts the stop and thus prevents a further movement of the stop in the peripheral direction in form-fitting manner.

Thus, in one embodiment, a stop of the balancing body, in particular, a part of a radial flange of the balancing body that defines the stop, the part preferably being defined by means of a notch, can be bent or is bent elastically or plastically toward the ring, in order to align with an axial shoulder or to lie opposite the latter and thus to attach the balancing body in the peripheral direction. Correspondingly, in one embodiment, a stop of the balancing body, in particular, a part of a radial flange of the balancing body that defines the stop, the part preferably being defined by means of a notch, can be bent or is bent elastically or plastically away from the ring, in order to be out of alignment with an axial shoulder or to no longer lie opposite the latter, so that the balancing body is movable in the peripheral direction. In one enhancement, an undercut section may also be brought into engagement with the ring or disengaged from the ring, in particular, its axial shoulder, by means of the elastic or plastic deforming of the radial flange, and thus the balancing body can be attached or detached in the radial direction. The stop may have a pre-defined bending line, along which it is or can be bent elastically or plastically toward the ring or away from the ring. This bending line can be defined, in particular, by a thinning of the material and/or a notch, which, in an enhancement, can additionally form the stop like a web or nose.

BRIEF DESCRIPTION OF THE DRAWINGS

Additional advantageous enhancements of the present invention can be taken from the following description of preferred embodiments. For this purpose and partially schematized, the following are shown:

FIG. 3 is a top view III according to FIG. 2;

FIG. 4 shows a part of a shroud of a continuous blade arrangement of a gas turbine having a balancing body according to another embodiment of the present invention in an illustration corresponding to FIG. 2;

FIG. 5 is a top view V according to FIG. 4; and

FIG. 6 shows a part of a shroud of a continuous blade arrangement of a gas turbine having a balancing body according to another embodiment of the present invention in an illustration corresponding to FIG. 5.

DESCRIPTION OF THE INVENTION

Figure 1:
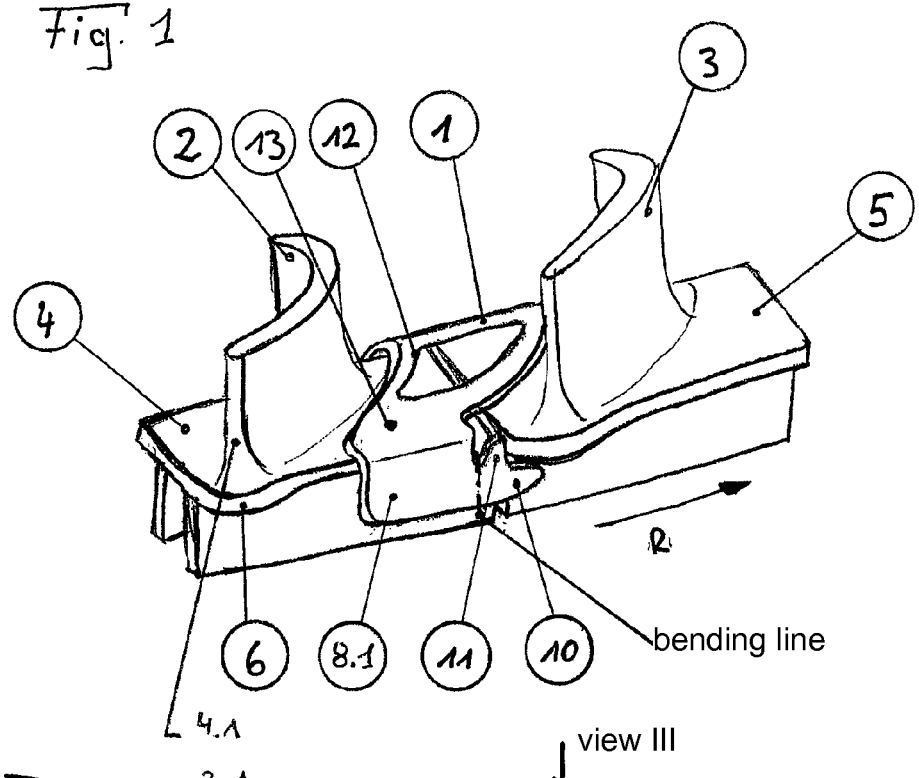
FIG. 1 is a part of a shroud of a continuous blade arrangement of a gas turbine having a balancing body according to an embodiment of the present invention in perspective view opposite to a through-flow direction.
Figure 2:
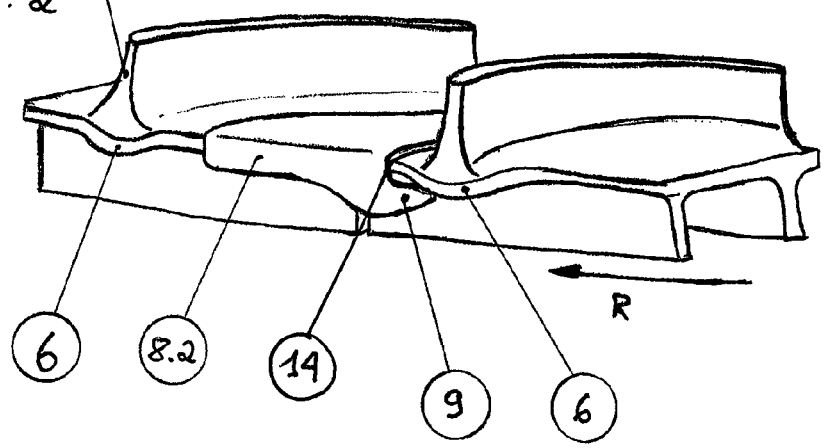
FIG. 2 shows the part of the shroud having the balancing body of FIG. 1 in perspective view in the through-flow direction.

FIGS. 1, 2 show, in perspective views opposite to (FIG. 1) or in (FIG. 2) a through-flow direction, a part of an outer shroud of a continuous blade arrangement of a low-pressure turbine end stage of a gas turbine having a balancing body 1 according to an embodiment of the present invention.

In the views of FIGS. 1, 2, two rotating blades 2, 3 of the continuous blade arrangement are shown truncated, each of these blades being formed integrally with a shroud 4 or 5, which—together with other shrouds that are not shown, form a ring in the form of a multi-part outer shroud. A leading edge (FIG. 2) or a trailing edge (FIG. 1) of a rotating blade are designated by reference 3.1 (see FIG. 2) or 4.1 (see FIG. 1). A top view direction of the view of FIG. 3 is also indicated by III in FIG. 2.

On axially opposite-lying front sides, each shroud 4, 5 has an axial shoulder 6, which is formed by means of an axial material projection in the embodiment of FIGS. 1-3.

The balancing body is disposed between the two rotating blades 2, 3 of the continuous blade arrangement, the blades being adjacent in one direction of rotation R and is distanced from the blades in the direction of rotation R.

It has a first radial flange 8.1 (see FIG. 1) and a second radial flange 8.2 (see FIG. 2) that is axially distanced from the first flange, the flanges being joined by means of an axial web 13 and engaging over the outer shroud 4, 5 in order to attach the balancing body in the axial direction (horizontal in FIG. 3) in form-fitting manner. A recess 12 is formed in the axial web 13, in order to establish a pre-defined mass or mass distribution of the balancing body.

A first stop 11 of the balancing body is formed integrally with the first radial flange 8.1 (see FIG. 1), in order to attach the balancing body in the direction of rotation R in form-fitting manner to the first axial shoulder of the outer shroud. The first stop 11 extends web-like or nose-like in the radial direction and is defined for this purpose by means of a radial notch. In this way, the web-like stop 11 is formed pliable in the direction of rotation R.

A second stop 14 of the balancing body is formed integrally with the second radial flange 8.2 (see FIG. 2), in order to attach in form-fitting manner the balancing body in the opposite direction or in the direction opposite to the direction of rotation R on the axially opposite-lying second axial shoulder 6 of the outer shroud.

Both radial flanges 8.1, 8.2 converge, when viewed in the direction of rotation R, on the front side toward the outer shroud (toward the top in FIGS. 1, 2), in order to avoid catching with an inlet lining (not shown).

A first undercut section 10, which engages under the first axial shoulder of the outer shroud in the radial direction (vertical in FIGS. 1, 2), is formed integrally with the first radial flange 8.1 (see FIG. 1), in order to attach the balancing body in form-fitting manner to this axial shoulder in the radial direction. Correspondingly, a second undercut section 9, which engages under the second axial shoulder 6 of the outer shroud in the radial direction, is formed integrally with the second radial flange 8.2 (see FIG. 2), in order to attach the balancing body in form-fitting manner to this axial shoulder in the radial direction.

In order to attach the balancing body 1 to the outer shroud 4, 5, the balancing body is first placed on the outer shroud radially from the outside, so that its radial flanges 8.1, 8.2 engage over it axially on both sides. Subsequently, the balancing body is moved on the outer shroud in the direction opposite to the direction of rotation R until its second stop 14 contacts the axial shoulder 6 and thus in form-fitting manner prevents a further movement in this peripheral direction, and the second undercut section 9 engages under this axial shoulder 6. Then the right part of the first radial flange 8.1 in FIG. 1 is first continually bent (to the right in FIG. 3) plastically away from the rotating blades 2, 3—as indicated by the broken line in FIG. 3, around a bending line B (see FIG. 1), which continues from the radial notch, and is then bent plastically toward the rotating blades (to the left in FIG. 3). In this way, the web-like first stop 11 is also brought into alignment with the axial shoulder and is braced thereby. At the same time, the first undercut section 10 engages under this axial shoulder. In this way, the balancing body 1 is attached to the outer shroud in both the radial direction as well as in the peripheral direction. For detaching, the above-described steps are conducted in the reverse sequence.

FIGS. 4, 5 show another embodiment of the present invention in illustrations corresponding to FIGS. 2, 3. The same elements are designated by identical reference numbers, so that reference is made to the rest of the description and only the differences relative to the other embodiments will be discussed below.

In the embodiment of FIGS. 4, 5, the second undercut section 9a is formed integrally with the second stop 14 by folding a tab and at the same time engaging it under the axial shoulder 6 and attaching the balancing body to the latter in a manner resistant to rotation in the direction opposite to the direction of rotation. Distanced therefrom in the direction of rotation, the second radial flange 8.2 attaches the balancing body in the axial direction. In this way, the individual regions of the balancing body can be or are better optimized to their respective functionality. On the other hand, the manufacture and/or strength can be or is improved by means of the integral formation shown in FIGS. 1-3. The undercut section 9a can be formed prior to placing the balancing body 1 on the outer shroud 4, 5; the balancing body can be hooked up correspondingly. Likewise, the undercut section also can be or is formed only after the radial placement of the balancing body 1 on the outer shroud 4, 5 by means of plastic folding of the tab.

FIG. 6 shows another embodiment of the present invention in illustration corresponding to FIG. 5. The same elements are again designated by identical reference numbers, so that reference is made to the rest of the description and only the differences relative to the other embodiments will be discussed below.

In the embodiment of FIG. 6, the axial shoulders do not extend continuously axially away from the rotating blade arrangement 2, 3 of the continuous blade arrangement as in the embodiments of FIGS. 1-5, but extend axially toward the rotating blade arrangement or toward the ring. They are formed correspondingly by means of back cuts of material 7 in relation to an edge of the outer shroud. Also in the embodiment of FIG. 6, the first undercut section 10 having the web-like first stop 11 (see FIG. 1 which corresponds in this respect), which first—as indicated by the broken line in FIG. 6—is bent continually plastically away from the rotating blades 2, 3 (toward the right in FIG. 6), around the bending line B (see FIG. 1), and is then bent plastically toward the rotating blades 2, 3 (to the left in FIG. 6). In this way, the web-like first stop 11 is also brought into alignment with the axial shoulder 7 and is braced thereby. As stated in the preceding, the contacting of the front side of the material back cut 7 by means of the stop 11 bent inward toward the ring is also designated as alignment in the sense of the present invention, since this arrangement prevents a movement of the balancing body in the direction of rotation. At the same time, the first undercut section 10 engages under this axial shoulder. In this way, the balancing body 1 attaches to the outer shroud both in the radial direction as well as in the peripheral direction. For detaching, the above-described steps are conducted in the reverse sequence.

Although exemplary embodiments were explained in the preceding description, it should be noted that a multiple number of modifications is possible. In addition, it should be noted that the exemplary embodiments only involve examples that in no way should limit the scope of protection, the applications and the construction. Rather, a guide is given to the person skilled in the art by the preceding description for implementing at least one exemplary embodiment, whereby diverse changes, particularly with respect to the function and arrangement of the described components, can be carried out without departing from the scope of protection, as it results from the claims and combinations of features equivalent to these.

What is claimed is:

1. A balancing body for fastening to a ring of a continuous blade arrangement of a compressor or turbine stage of a gas turbine, wherein the balancing body comprises a first stop for form-fitting attachment of the balancing body in one peripheral direction (R) to a first axial shoulder of the ring wherein the first axial shoulder is an axial material projection from an outer shroud of the ring and at least one undercut section for the form-fitting attachment of the balancing body to the ring in a radial direction;

wherein the balancing body is distanced from adjacent rotating blades of the continuous blade arrangement.

2. The balancing body according to claim 1, further comprising a second stop for form-fitting attachment of the balancing body in an opposite direction to a second axial shoulder of the ring in an opposite peripheral direction, the second axial shoulder projecting is an axial material projection from an outer shroud of the ring.

3. The balancing body according to claim 1, further comprising:

a first radial flange and a second radial flange, axially distanced from the first flange and connected to it by an axial web for form-fitting attachment of the balancing body to the ring in an axial direction.

4. The balancing body according to the claim 3, wherein, for the form-fitting attachment of the balancing body, the first stop and the second stop, which are disposed on the radial flanges in one peripheral direction, are formed integrally with the radial flanges, and/or that the radial flanges converge toward the ring, viewed in one direction of rotation (R).

5. The balancing body according to claim 1, wherein, for the form-fitting attachment of the balancing body in an axial direction, the undercut section, which is disposed on the radial flanges, and/or the first stop and the second stop for the form-fitting attachment of the balancing body in one peripheral direction and formed integrally with the radial flanges.

6. The balancing body according to claim 1, wherein the undercut section for engaging under the first axial shoulder and the second axial shoulder of the ring is configured and arranged for the form-fitting attachment of the balancing body in one peripheral direction.

7. The balancing body according to claim 1, wherein the first stop for the form-fitting attachment of the balancing body in one peripheral direction extends web-like in a radial direction.

8. The balancing body according to claim 1, wherein, for the form-fitting attachment of the balancing body in the one peripheral direction (R), the first stop is brought into alignment with the first axial shoulder by means of plastic deformation.

9. A continuous blade arrangement of a compressor or turbine stage of a gas turbine, comprising:

a radially outer or inner ring with at least one axial shoulder having a balancing body having a first stop for form-fitting attachment of the balancing body in the one peripheral direction (R) to a first axial shoulder of the ring and at least one undercut section for the form-fitting attachment of the balancing body to the ring in a radial direction, which is attached in form-fitting manner to the shoulder by means of at least one stop in one peripheral direction, wherein the first axial shoulder is an axial material projection from an outer shroud of the radially outer or inner ring;

wherein the balancing body is distanced from adjacent rotating blades of the continuous blade arrangement.

10. The continuous blade arrangement according to claim 9, wherein the at least one axial shoulder extends axially away from a rotating blade arrangement of the continuous blade arrangement or toward the rotating blade arrangement.

11. A method for attaching a balancing body to the ring of a continuous blade arrangement, comprising the steps of:

providing a balancing body for fastening to a ring of a continuous blade arrangement of a compressor or turbine stage of a gas turbine, wherein the balancing body includes at least one stop for form-fitting attachment of the balancing body in one peripheral direction (R) to a first axial shoulder of the ring and at least one undercut section for the form-fitting attachment of the balancing body to the ring in a radial direction, where the first axial shoulder is an axial material projection from an outer shroud of the ring;

bringing the at least one stop plastically into alignment with the first axial shoulder of the ring for form-fitting attachment of the balancing body to the first axial shoulder in the one peripheral direction;

wherein the balancing body is distanced from adjacent rotating blades of the continuous blade arrangement.

12. A method for detaching a balancing body from the ring of a continuous blade arrangement, comprising the steps of:

providing a balancing body for fastening to a ring of a continuous blade arrangement of a compressor or turbine stage of a gas turbine, wherein the balancing body includes a least one stop for form-fitting attachment of the balancing body in one peripheral direction (R) to a first axial shoulder of the ring and at least one undercut section for the form-fitting attachment of the balancing body to the ring in a radial direction, where the first axial shoulder is an axial material projection from an outer shroud of the ring; and bringing the at least one stop plastically out of alignment for the form-fitting attachment of the balancing body to the first axial shoulder in the one peripheral direction;

wherein the balancing body is distanced from adjacent rotating blades of the continuous blade arrangement.

* * * * *